United States Patent [19]

Sick et al.

[11] Patent Number: 4,487,237

[45] Date of Patent: Dec. 11, 1984

[54] APPARATUS FOR COMBINING FIRST AND SECOND LIQUIDS IN A VESSEL TO ACHIEVE A PRECISE DOSAGE OF THE SECOND LIQUID AND A PRECISE FINAL HEIGHT OF THE COMBINED LIQUIDS

[76] Inventors: Peter Sick, Ahlenbachweg 21a, D-7804 Glottertal, Fed. Rep. of Germany; Joseph Menini, 27, Rue de La Melenne, F-25230 Seloncourt, France

[21] Appl. No.: 459,974

[22] Filed: Jan. 21, 1983

[30] Foreign Application Priority Data

Jan. 28, 1982 [DE] Fed. Rep. of Germany ....... 3202655

[51] Int. Cl.³ .......................... B65B 31/00; B65B 3/26
[52] U.S. Cl. ..................................... 141/39; 141/198; 53/432; 53/102
[58] Field of Search ...................... 141/1–12, 141/37–70, 100–107, 192–229, 234–248, 285–310, 250–284; 53/432, 510; 99/323.1, 323.2; 261/DIG. 7; 426/392

[56] References Cited

U.S. PATENT DOCUMENTS 4,369,820 1/1983 Ahlers et al. ....................... 141/286

Primary Examiner—Houston S. Bell, Jr.
Attorney, Agent, or Firm—Burns, Doane, Swecker & Mathis

[57] ABSTRACT

An apparatus provides for the addition of a predetermined amount of a second liquid (metering liquid) to a first liquid contained in a vessel, with a predetermined final fill level of the vessel being attained. By introducing a pressurizing gas into the vessel an amount of the first liquid is forced out of the vessel through a riser tube until the liquid level reaches a first opening in the tube to cause the expulsion of the first liquid to cease. The predetermined amount of the second liquid is then introduced in the vessel. Some of the first liquid is then returned to the vessel while expelling gas from a second opening in the tube until the liquid level covers such second opening to cause the further introduction of first liquid to cease. Thus, the desired final fill level is automatically obtained.

7 Claims, 7 Drawing Figures

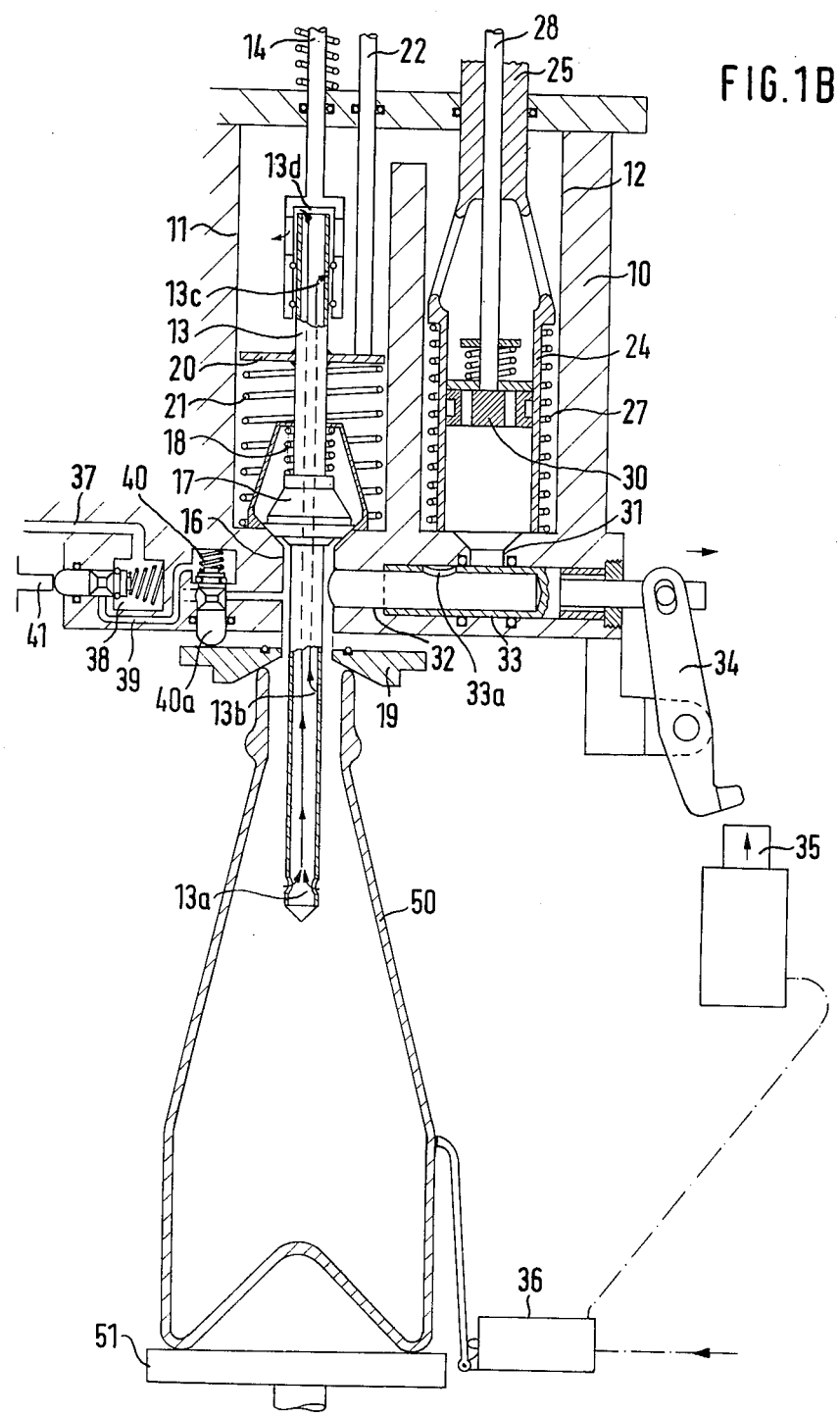

APPARATUS FOR COMBINING FIRST AND SECOND LIQUIDS IN A VESSEL TO ACHIEVE A PRECISE DOSAGE OF THE SECOND LIQUID AND A PRECISE FINAL HEIGHT OF THE COMBINED LIQUIDS

BACKGROUND AND OBJECTS OF THE INVENTION

The invention concerns a process and an apparatus for the addition of a predetermined amount of a second liquid (metered liquid) to a first liquid contained in a vessel (preferably a bottle), wherein the final filled state of the vessel should attain a predetermined height.

In different types of industry, for example in the production of medicines, detergents and rinsing agents, and of beverages, it is necessary to add to a base liquid contained in an apportioned vessel, i.e., a bottle, a second liquid (metering liquid) in a predetermined quantity, wherein, however, a predetermined height is specified for the final filled state. The automation of this process is difficult in particular when different amounts of the metering liquid are to be added and when the filling state of the base liquid already in the container is not defined accurately, which is the case especially with foaming liquids. Merely as an example, the production of champagne is mentioned, in particular the addition of liqueur after unstopping (removal of the ice and yeast plug) the bottles. In the process, the addition of different metered amounts of liqueur is required and the filling level of the bottle after unstopping is not defined exactly. It is, therefore, extremely difficult to obtain an exactly defined fill level after the metering addition. In any case, the devices known heretofore are not suitable for the automation of the process.

It is, therefore, the object of the present invention to provide a process and an apparatus making it possible in a simple and automatible manner to add to a base liquid already in the container, the amount desired of a second liquid and to obtain with great accuracy a defined, constant final fill level.

SUMMARY OF A PREFERRED EMBODIMENT OF THE INVENTION

According to the invention, initially a first liquid is pressured out of the vessel by means of a pressurizing gas (an inert gas) until a predetermined first fill level is attained. The first liquid pressured from the vessel is collected in a collector container. Subsequently, the metering liquid is added in the amount desired, and finally the bottle is filled from the collector container until the final fill level is attained exactly.

By means of the apparatus according to the invention, the two fill levels are attained in a manner that is both simple and accurate in that a riser pipe protrudes into the bottle. Two orifices are provided in the riser pipe which in a nearly automatic fashion effect the two fill levels without the need for special measuring devices.

For the production of champagne there is furthermore the great advantage that in order to attain the final fill level, the same liquid that had been in the bottle before, is brought back, in contrast to the known devices in which generally a liquid originating in the content of different bottles is used for the filling. The apparatus according to the invention may be combined in a simple manner with other processing installations, for example, those opening and/or sealing the bottles in a single machine block, whereby the entire production and processing process is further automated.

Obviously, several metering liquids may be added, in which case several metering vessels must be connected with the pipe of a single collector container.

THE DRAWING

In the drawing, a form of embodiment of the invention is shown as an example, in an application to the production of champagne. In the drawing:

FIGS. 1A and 1B show the apparatus in an outline, in partial cross-section with FIG. 1A depicting control elements, and FIG. 1B depicting the metering unit itself; and FIGS. 2A–2E depict a lower end of a cylinder in the metering vessel and indicate schematically the sequential steps which are performed to refill the cylinder with a new charge of second liquid.

DETAILED DESCRIPTION OF A PREFERRED EMBODIMENT OF THE INVENTION

Figure 1A:
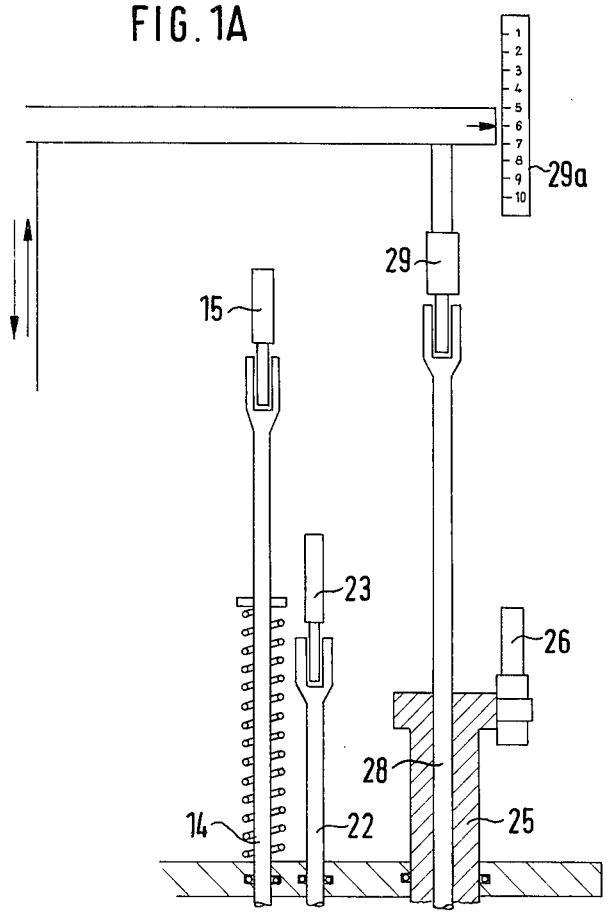

The metering apparatus designated in FIG. 1B in its entirety by numeral 10, comprises two essentially cylindrical vessels 11 and 12, disposed adjacent and parallel to each other, i.e., a collector container 11 and metering vessel 12. In the collector container 11 a vertical riser pipe 13 is located, which is capable of limited axial displacement. The pipe 13 is closed on both ends, while having (i) an inlet orifice 13a at its lower end, (ii) an inlet orifice 13b spaced from the orifice 13a and (iii) two outlet orifices 13c and 13d at its upper end. The upper end of the riser pipe 13 is surrounded by the sleeve-like end of a control rod 14, thereby covering the orifices 13c and 13d. The control rod is actuated in the axial direction by a control cam 15 articulated onto the upper end of said rod. From the bottom of the vessel 11, a pipe section 16 rises concentrically surrounding the rise pipe 13, with the transition from the bottom of the vessel to the pipe section 16 being designed as a valve seat for a valve body 17. The valve body is urged by a spring 18 against the valve seat. On the free lower end of the pipe section 16, a centering ball 19 is located. In the vessel 11, an annular disk 20 is fastened to the riser pipe 13, which is urged in the upward direction by a helical spring 21 placed between the bottom side of the annular disk and the bottom of the vessel. To the upper side of the disk 20 is secured a control rod 22. The control rod is actuated by a control cam 23 (see FIG. 1A). Within its top area, the collector container 11 is in communication with the metering vessel 12. In the metering vessel 12, a concentric cylinder 24 is arranged in an axially displaceable manner and concentrically with respect to the metering vessel. The cylinder 24 is displaceable by means of a hollow control rod 25, actuated by a control cam 26 (FIG. 1A). A spring 27 biases the cylinder 25 in the upward direction. A further control rod 28 is located within the hollow control rod 25 and is actuated by a control cam 29 having a metering setting 29a. The cam 29 is equipped at its bottom side with a piston 30 fitted sealingly into the cylinder 25. An outlet 31 is located at the bottom of the vessel 12 which opens into a metering pipe 32. The opening of the container outlet 31 into the metering pipe 32 may be closed by a sliding sleeve 33 having an orifice 33a. The sleeve 33 is actuated through a lever linkage 34 by means of an actuating piston 35, which in turn, is controlled by means of a contact switch 36.

A valve 38 is set into a carbon dioxide line 37 leading from a source of carbon dioxide (not shown) the outlet line 39 of which opens into the outlet pipe section 16 of the collector container 11. A pressure-actuated safety valve 40 is interposed in the outlet line 39. The valve 38 may be actuated by a further control cam 41 and the safety valve 40 by the centering bell 19.

The apparatus operates in the following manner. Depicted in FIG. 1B is an opened and unstopped (relieved of the yeast-ice block) champagne bottle 50 which therefore is filled to an undefined level. The bottle is placed on a plate 51 under the apparatus 10 and then raised by the plate until the upper rim of the bottle abuts against the centering bell 19. Under the pressure of the bottle, the centering bell 19 actuates a press-button 40a of the safety valve 40, whereby the latter is opened. The control cam 41 is thereupon actuated to open the carbon dioxide valve 38 with the consequence that gaseous carbon dioxide flows from the line 37 through the line 39 into the pipe section 16 and arrives from the latter in the bottle 50. Simultaneously, the control cam 15 lifts the control rod 14 so that the opening 13d of the riser pipe 13 is opened. As a result, the carbon dioxide entering the bottle 50 is able to pressure the liquid (champagne) located above the orifice 13a of the riser pipe 13 through the opening 13a into the riser pipe and upward in said riser pipe, whereupon the liquid flows from the orifice 13d, which is open, into the collector container 11. This pressuring of the liquid from the bottle 50 ceases when the level of the liquid in the bottle attains a level corresponding to the lower rim of the orifice 13a (defined fill level). The control cam 41 now closes the valve 38, thereby interrupting the supply of carbon dioxide. It is essential that in this state a pressure equilibrium is established between the bottle, the collector container 11 and the metering vessel 12.

The moving bottle 50 now comes into contact with the contact switch 36, whereupon the piston 35 actuates the lever 34, displacing the sleeve 33 so that the orifice 33a of the latter is aligned with the outlet 31 of the metering vessel 12. The control cam 29 is now downwardly pressuring the piston 30 by means of the rod 28, whereby a predetermined amount of a liqueur (second fluid) is transported from the container 24 onto the pipe 32 and from here into the pipe section 16 and finally into the bottle 50. Following the completion of this process, the sleeve 33 returns into its initial position, thereby closing the outlet 31.

In the next step, the control cam 23 relieves the control rod 22 and thus the annular disk 20, with the consequence that the control cam 23, together with the pipe 13 and the valve body 17 located therein, is lifted by the action of the spring 21. Simultaneously, the control cam 15 raises the rod 14 even further, until the orifice 13c is open. The liquid (champagne) is now flowing from the vessel 11 through the valve opening into the pipe section 16 and further into the bottle 50, with the orifices 13b and 13c serving as openings for the escape of air. This flow of the liquid into the bottle 50 is terminated abruptly when the fill level of the bottle 50 has attained the upper rim of the ventilation orifice 13b, as the continued escape of the gas from the bottle is thereby rendered impossible. The bottle will therefore be filled exactly to a fill level corresponding to the upper rim of the orifice 13b. The control cam 23 thereupon presses the annular disk 20 downward, whereby the valve body 17 is returned to its valve seat and the control cam 15 closes the orifices 13c and 13d of the riser pipe 13 by pressuring the control rod 14 downward. The initial position of the apparatus is thus re-established.

It is merely necessary now to bring the carbon dioxide located above the fill level in the bottle 50 to atmospheric pressure, which may be effected in a known manner by the use of a conventional sensing valve (known in Germany as a "schnuffelventil"), located for example, in the centering bell 19 or being combined with the carbon dioxide valve 19. Following this "deaerating" the plate 51 and the bottle 50 supported by it are lowered and transported to a corking installation of arbitrary configuration.

Figure 2A:
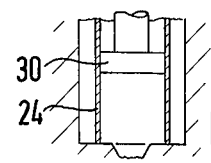
Figure 2B:
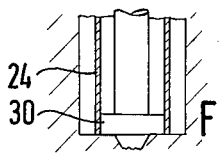
Figure 2C:
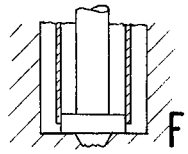
Figure 2D:
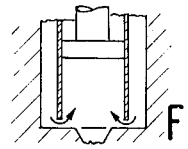
Figure 2E:
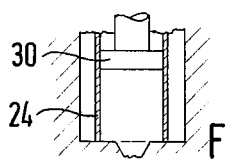

During the above-described process of the filling of the bottle 50, the cylinder space in front of the piston 30 is refilled for the following metering step, after the addition of the liqueur. According to the diagrams 2A to 2E, initially the piston 30 is pressured downward by the action of the control piston 30 (FIG. 2A), until it attains its lowest position (FIG. 2B). After the aforedescribed closing of the outlet 31 of the metering vessel 12, the control cam 26 relieves the hollow control rod 25 and thus the cylinder 24, with the consequence that the latter is raised by the spring 27 (FIG. 2C). The control cam 29 thereupon urges the piston 30 in the upward direction by means of the control rod 28, so that the space in front of the frontal surface of the piston is refilled with liqueur by the suction of the vacuum created in this manner. The height of the stroke of the piston and thus the amount of liqueur to be added during the following metering step depends on the setting effected on the setting device 29a. When the piston 30 has attained its uppermost position, the control cam 26 pressures the cylinder 24 again downward into its initial position (FIG. 2E). The metering vessel 12 is then ready for the next metering step.

The process described hereinabove may be effected with an interruption of the conveying movement of the bottles, but it is preferable to transport the bottle together with the apparatus 10. The movement may be linear or, for example with the use of conventional star conveyors, circular. In the latter case, it is advantageous to combine a number of the devices 10 corresponding to the number of positions on the star conveyor into a common annular element, wherein the vessels 11 and 12 star-shaped lines are leading into the center of the annulus, to a common liquid outlet line and a common liqueur supply line. The champagne removed from the bottle is returned in part to the bottle following the addition of the liqueur. The remaining part is retained in the vessel 11, equipped with an overflow. Therefore, following the addition of the liqueur, champagne already contained in preceding bottles is being returned into each bottle to attain its final fill level. This is exactly what is not possible with the known metering devices.

Even though in the description set forth hereinabove the process of the metering of liqueur has been selected to explain the invention, the apparatus according to the invention may obviously be utilized in different process steps of the production of champagne, for example, the addition of the yeast solution to still wine. It is further possible and advantageous to combine the apparatus according to the invention with other processing devices into a single block, for example, with the closing installations. It is then possible for example, to effect all of the processes of uncorking, metering and sealing (corking or closing with crown caps) within a single machine block.

It may be advantageous in certain cases to effect the filling and metering process with the bottle tilted from the vertical position (inclined position). In this case, it is necessary to assure the exact synchronization of the tilting movement of the bottle and the inclination of the metering and filling apparatus.

The invention is obviously not restricted to the processes of the production of champagne, rather it may be applied with advantage wherever another liquid is to be added to a liquid in a bottle in exact amounts and an accurate final fill level is to be attained. Merely as examples, the production of liquid rinsing and detergent substances and of medicines are mentioned. The invention in all of these cases provides the essential advantage that (i) the original fill of the bottle or container is not required to have an exact fill level, which is important especially in the case of foaming liquids, (ii) the addition of the second liquid (metering) is effected in accurate doses and (iii) the final filled state is defined with a high exactitude. All of these processes may be effected automatically or semiautomatically in a comparatively simple manner.

Although the present invention has been described in connection with a preferred embodiment of the invention, it will be appreciated by those skilled in the art that additions, modifications, substitutions, and deletions not specifically described, may be made without departing from the spirit and scope of the invention as defined in the appended claims.

What is claimed is:

1. Apparatus for adding a predetermined amount of a second liquid to a vessel which contains a first liquid and for achieving a final fill level of liquid in the vessel, said apparatus comprising:

a riser pipe projecting into the vessel and into the first liquid, said riser pipe including first and second inlet openings, and at least one outlet opening;

means for introducing pressurized gas into the vessel to expel some of the first liquid into said first inlet opening and upwardly through said riser pipe until the level of said first liquid in the vessel reaches the first inlet opening whereupon further expulsion of said first liquid automatically ceases;

a collector container communicating with said first outlet for receiving the expelled first liquid;

means for introducing the predetermined amount of second liquid into the vessel; and means for communicating the collector container with the vessel to conduct first liquid back into the vessel, with air being evacuated from the vessel through the second inlet opening until liquid in the vessel covers the second inlet opening, whereupon further entry of first liquid into the vessel ceases.

2. Apparatus according to claim 1, wherein said collector container is disposed above the vessel and includes a discharge section communicating with the vessel, the riser pipe passing upwardly through the discharge section and into the collector container, a raisable valve body displaceable within the collector container for closing-off the discharge section, means for raising the valve body to permit first liquid to flow from the collector container into the vessel, a gas line communicating with the discharge section for introducing the pressurized gas; a metering pipe communicating with the discharge section for conducting the second liquid to the vessel from a source of second liquid; and a closure valve disposed in the gas line for closing-off the gas line when the second liquid is conducted to the vessel.

3. Apparatus according to claim 2 including a safety valve in the gas line; a centering bell disposed adjacent a lower end of the discharge section, the centering bell being vertically movable in response to initial engagement with the vessel to open the safety valve.

4. Apparatus according to claim 2, wherein an annular disk is fastened to the riser pipe; a spring arranged to bias the disk upwardly; and a control rod attached to the disk to push the latter downwardly against the bias of the spring.

5. Apparatus according to claim 4 including a metering vessel containing the second liquid; a cylinder being disposed in the metering vessel in an axially displaceable manner; a metering piston displaceably disposed in the cylinder; the metering vessel including an outlet communicating with the metering pipe; a sleeve slidably disposed in the metering pipe and including an orifice which is alignable with the last-named outlet to conduct the second liquid into the metering pipe.

6. Apparatus according to claim 5 including a linkage for sliding the sleeve; a pressure piston for actuating the linkage; and a contact switch for activating the pressure piston in response to the vessel reaching a preselected location.

7. Apparatus according to claim 5, wherein the collector container communicates with the metering vessel to equalize pressure therein.

* * * * *